(No Model.)  10 Sheets—Sheet 1.

F. RICHARD.
TELEGRAPHIC TRANSMISSION OF INDEX MOVEMENTS.

No. 420,102.  Patented Jan. 28, 1890.

Witnesses:
J. A. Criswell.
C. K. Fraser.

Inventor:
Felix Richard.
By his Attorneys,
Arthur C. Fraser & Co.

(No Model.)　　　　　　　　　　　　　　10 Sheets—Sheet 4.
F. RICHARD.
TELEGRAPHIC TRANSMISSION OF INDEX MOVEMENTS.
No. 420,102.　　　　　　　　　　Patented Jan. 28, 1890.

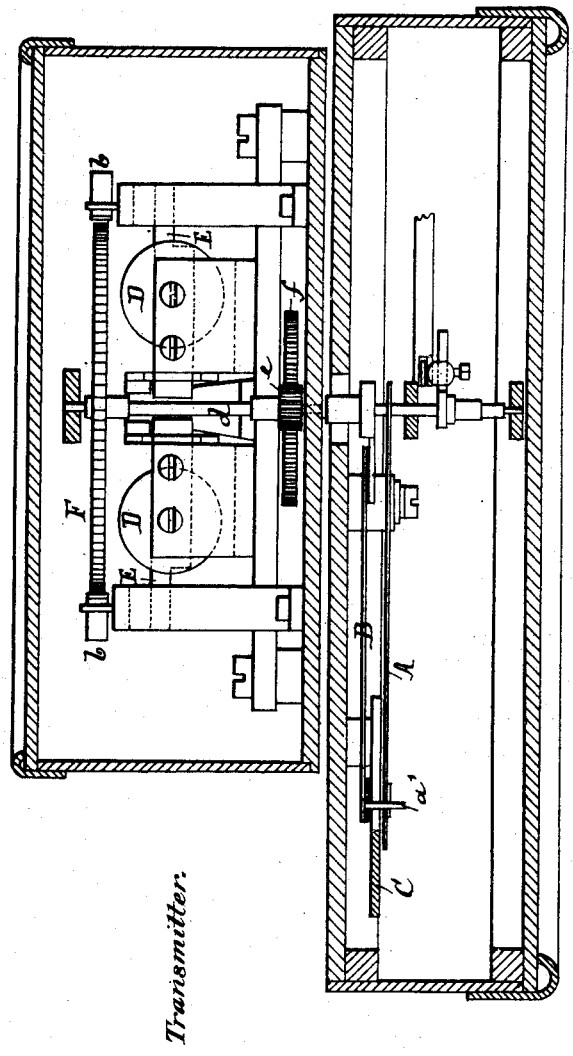

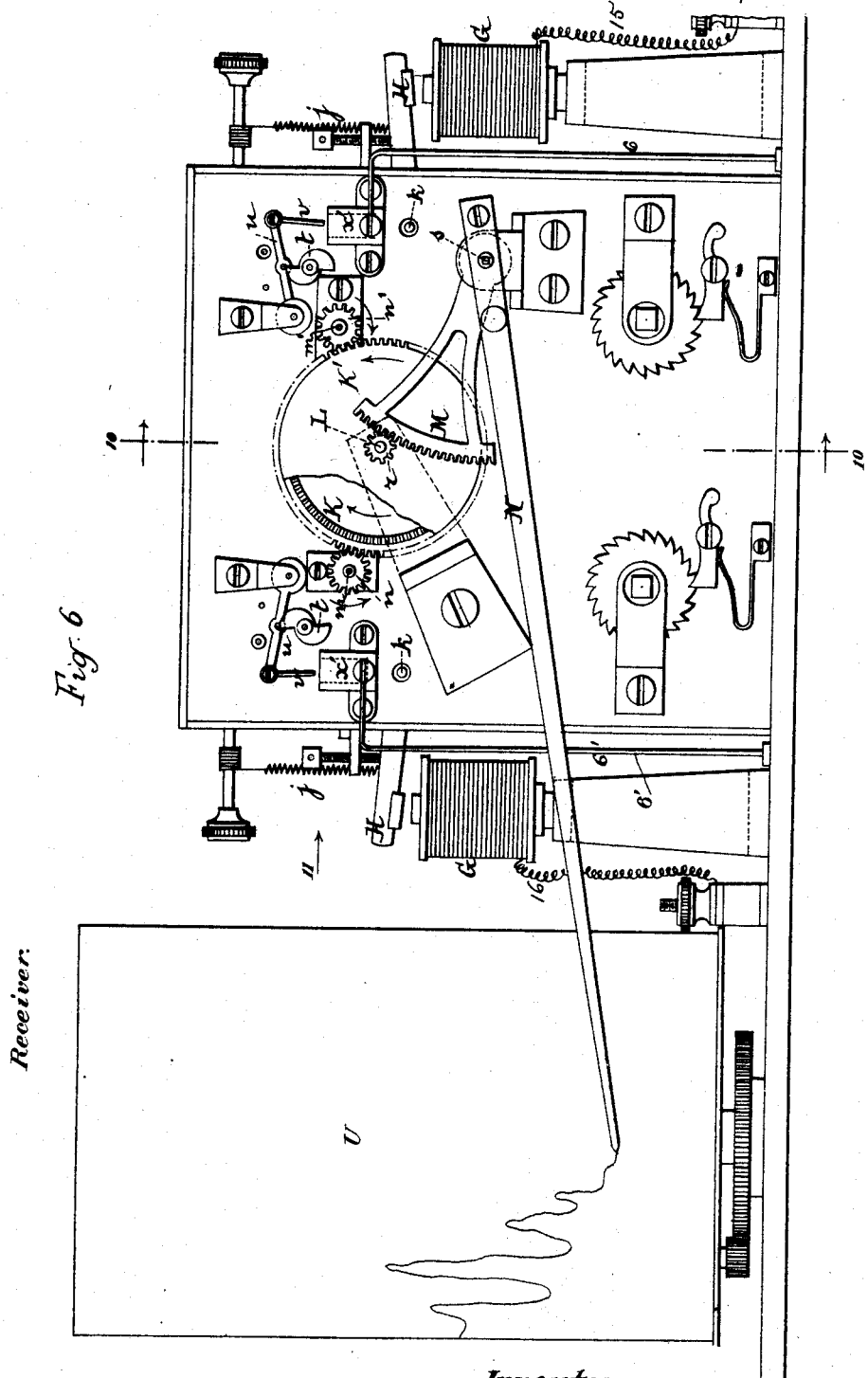

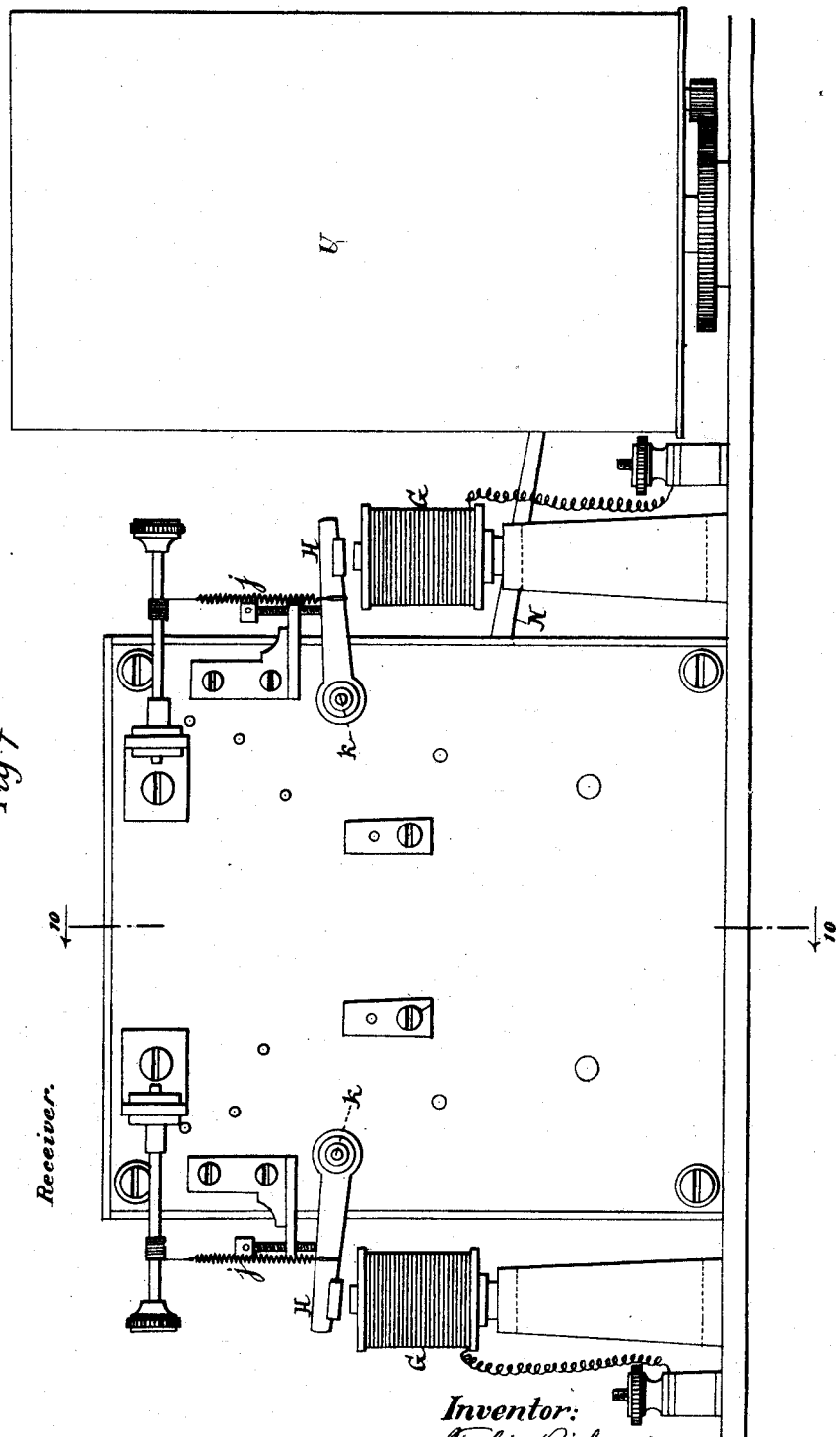

(No Model.)  10 Sheets—Sheet 8.
F. RICHARD.
TELEGRAPHIC TRANSMISSION OF INDEX MOVEMENTS.
No. 420,102.  Patented Jan. 28, 1890.
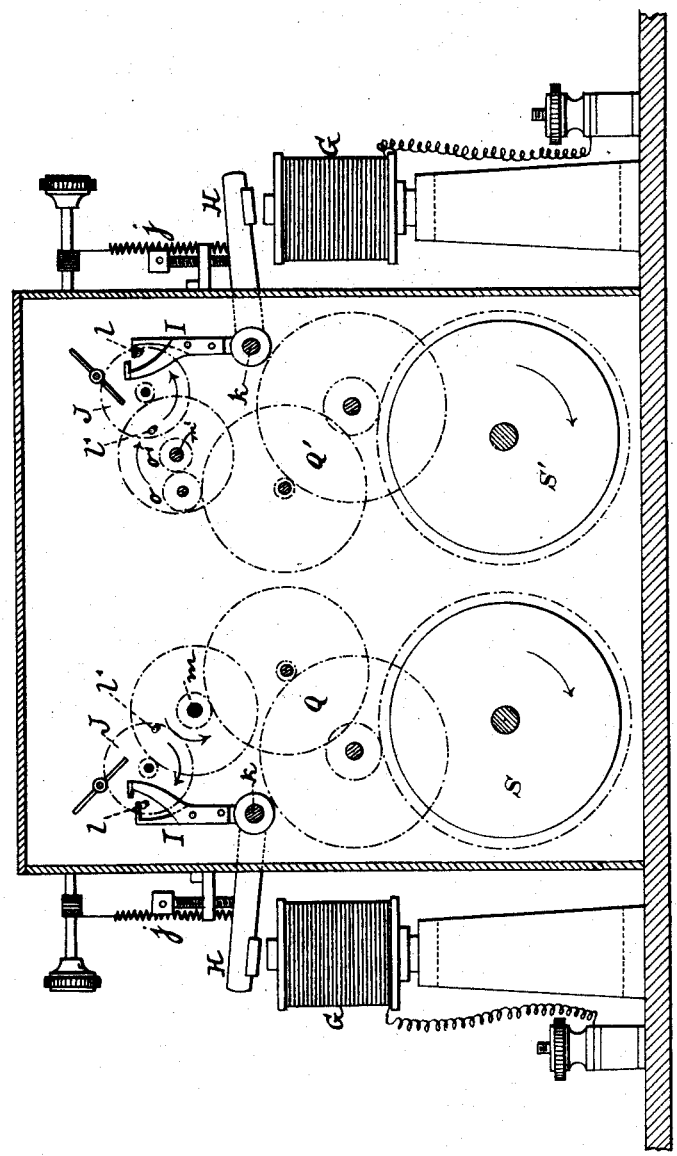
Witnesses:
J. A. Criswell.
C. K. Fraser.
Inventor:
Felix Richard.
By his Attorneys,
Arthur G. Fraser & Co.

(No Model.) 10 Sheets—Sheet 9.
F. RICHARD.
TELEGRAPHIC TRANSMISSION OF INDEX MOVEMENTS.
No. 420,102. Patented Jan. 28, 1890.
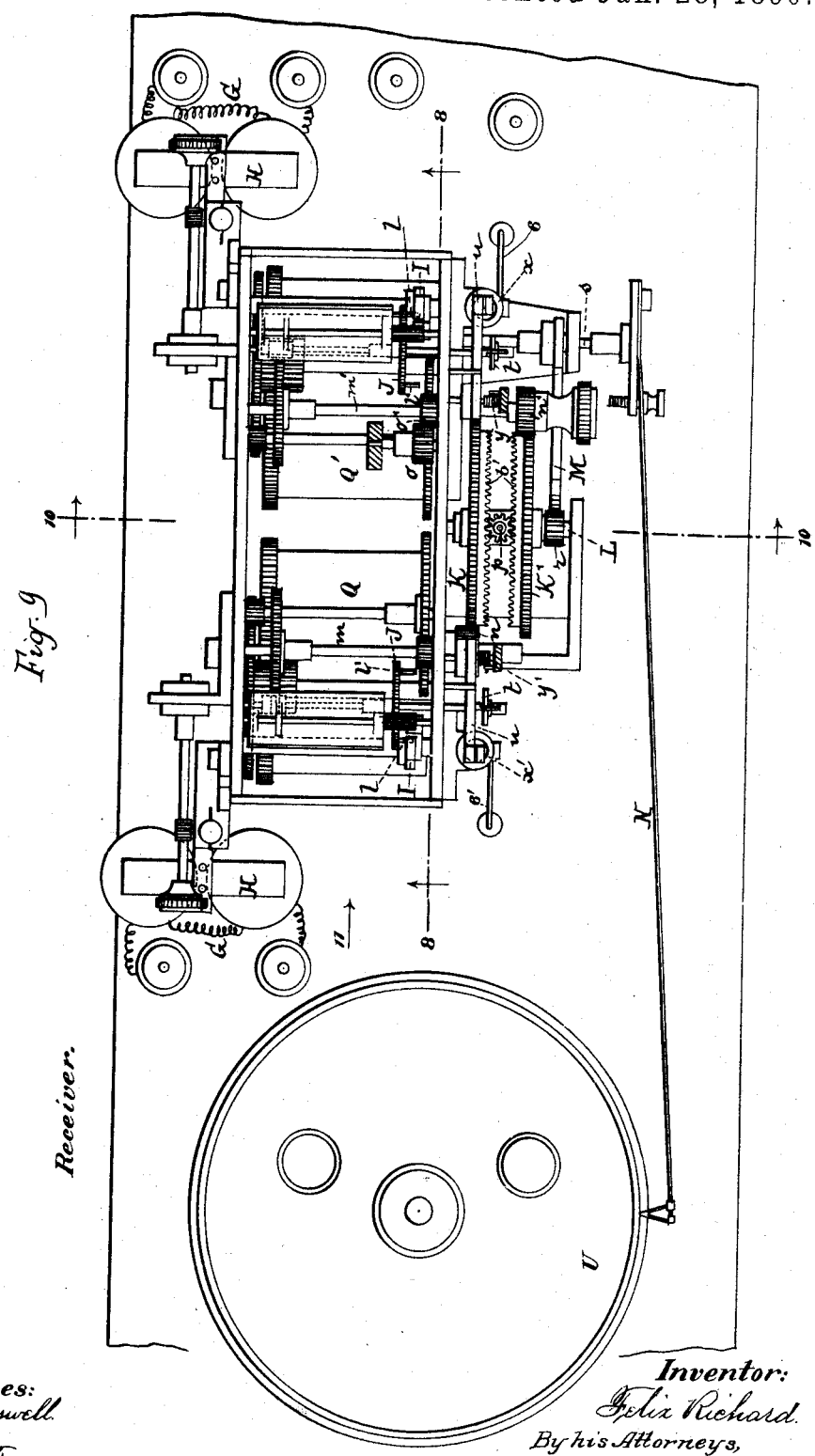
Witnesses:
J. A. C. Criswell.
C. K. Fraser.
Inventor:
Felix Richard.
By his Attorneys,
Arthur C. Fraser & Co.

(No Model.) 10 Sheets—Sheet 10.
F. RICHARD.
TELEGRAPHIC TRANSMISSION OF INDEX MOVEMENTS.
No. 420,102. Patented Jan. 28, 1890.
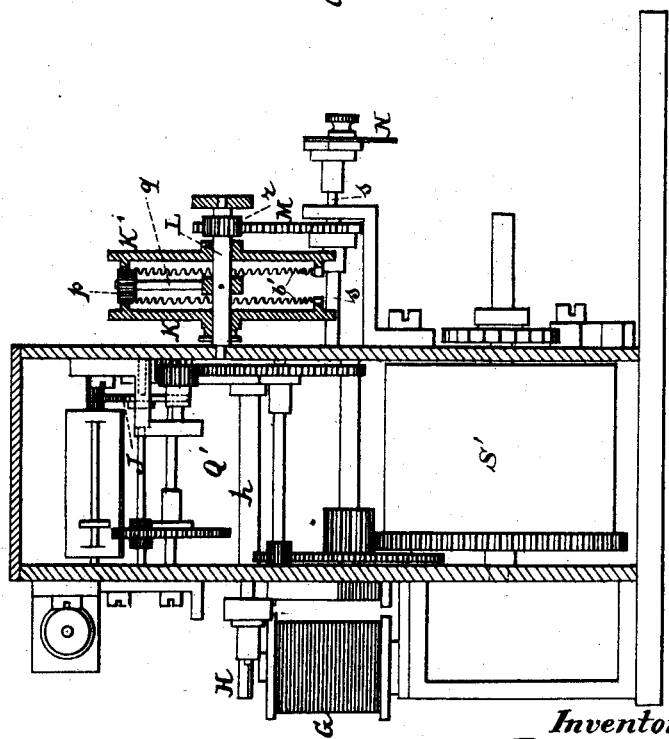
Witnesses:
Inventor:
Felix Richard.
By his Attorneys,

UNITED STATES PATENT OFFICE.

FELIX RICHARD, OF PARIS, FRANCE, ASSIGNOR TO THE SOCIÉTÉ RICHARD FRÈRES, OF SAME PLACE.

TELEGRAPHIC TRANSMISSION OF INDEX MOVEMENTS.

SPECIFICATION forming part of Letters Patent No. 420,102, dated January 28, 1890.

Application filed December 13, 1888. Serial No. 293,468. (No model.)

*To all whom it may concern:*

Be it known that I, FELIX RICHARD, a citizen of the French Republic, residing in Paris, France, have invented certain new and useful Improvements in the Telegraphic Transmission of Index Movements, of which the following is a specification.

The object of this invention is to provide a system for transmitting to a distance the indications furnished by an instrument comprising an index or needle movable over a dial, these indications on their transmission to the receiver being reproduced by the movements of an index or needle. For a recording-instrument the index of the receiver moves with reference to a band of paper, which is moved under the action of a clockwork. The tracing-point of the needle traces on the moving band of paper a line, the successive ordinates of which indicate the successive positions of the needle of the transmitter.

The annexed drawings represent my improved system in its preferred application.

Figure 1:
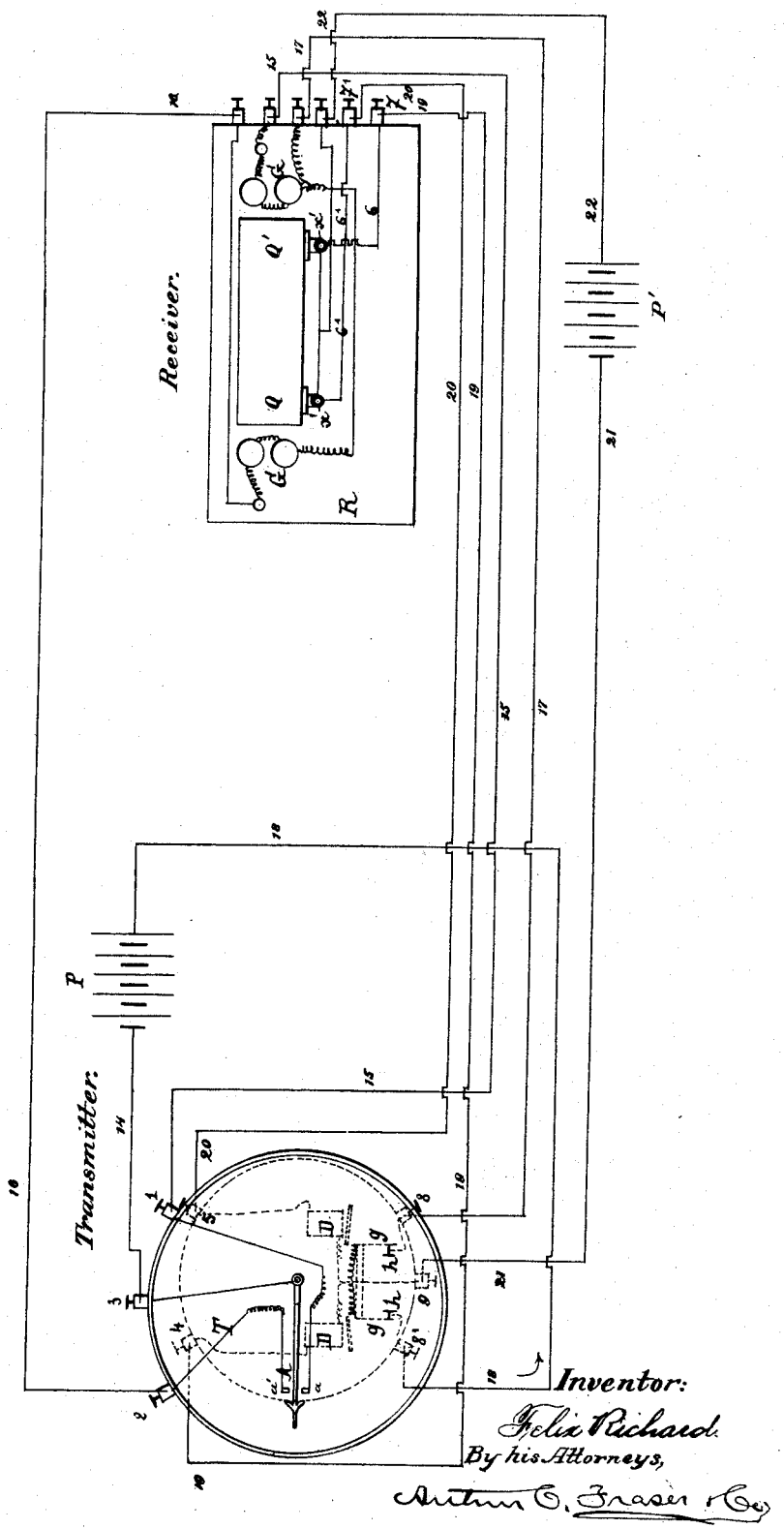
Figure 2:
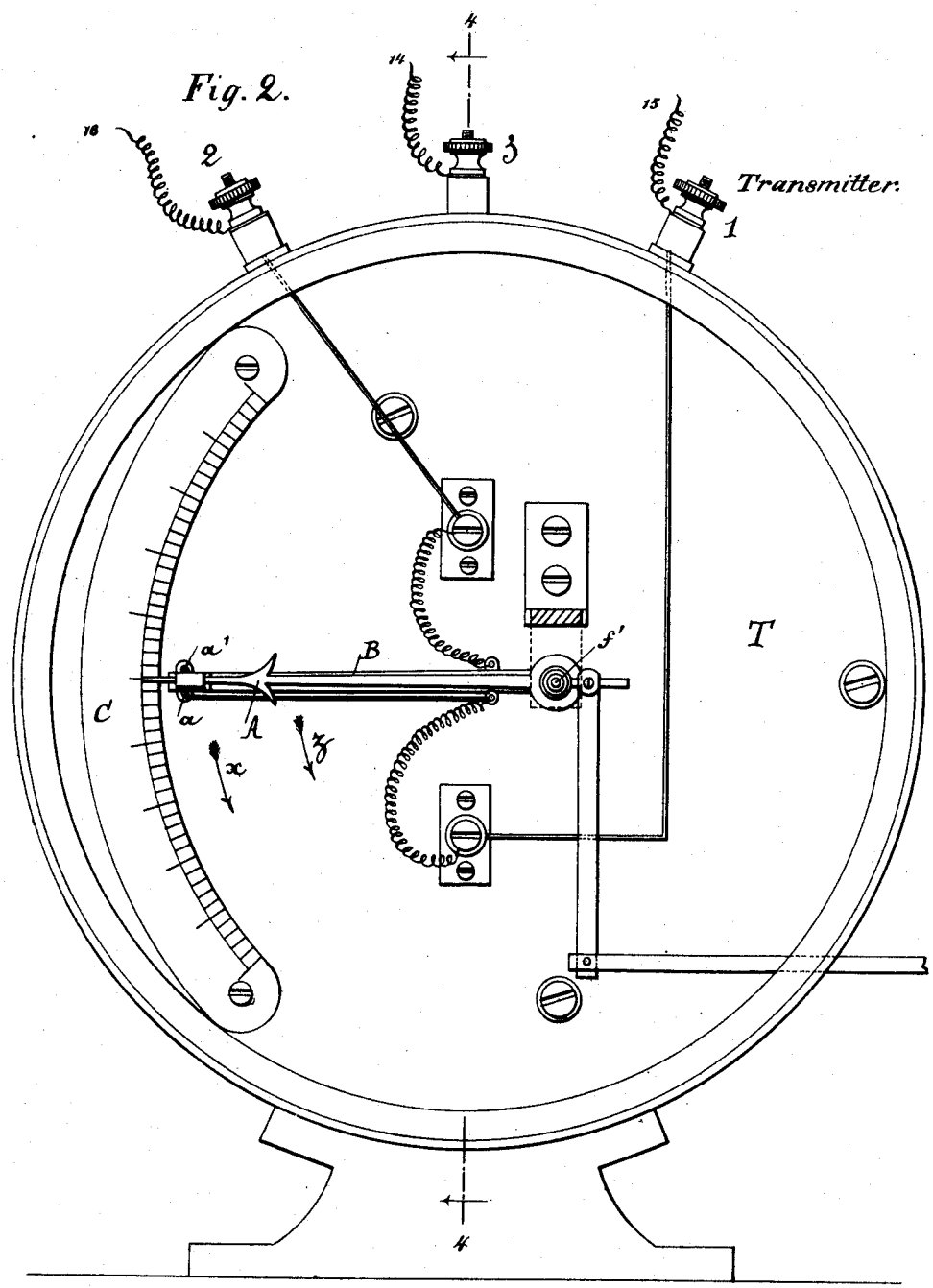
Figure 3:
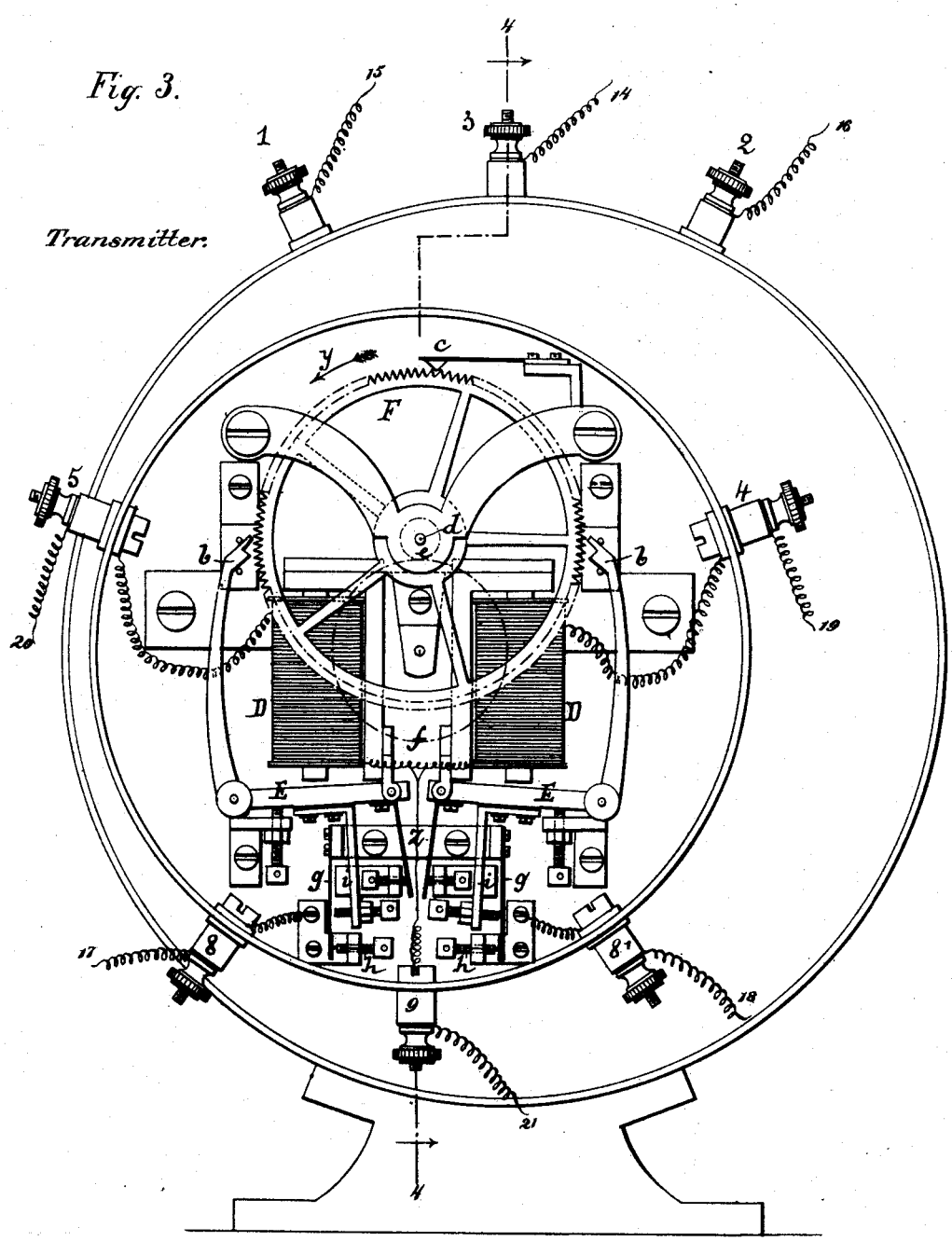
Figure 4:
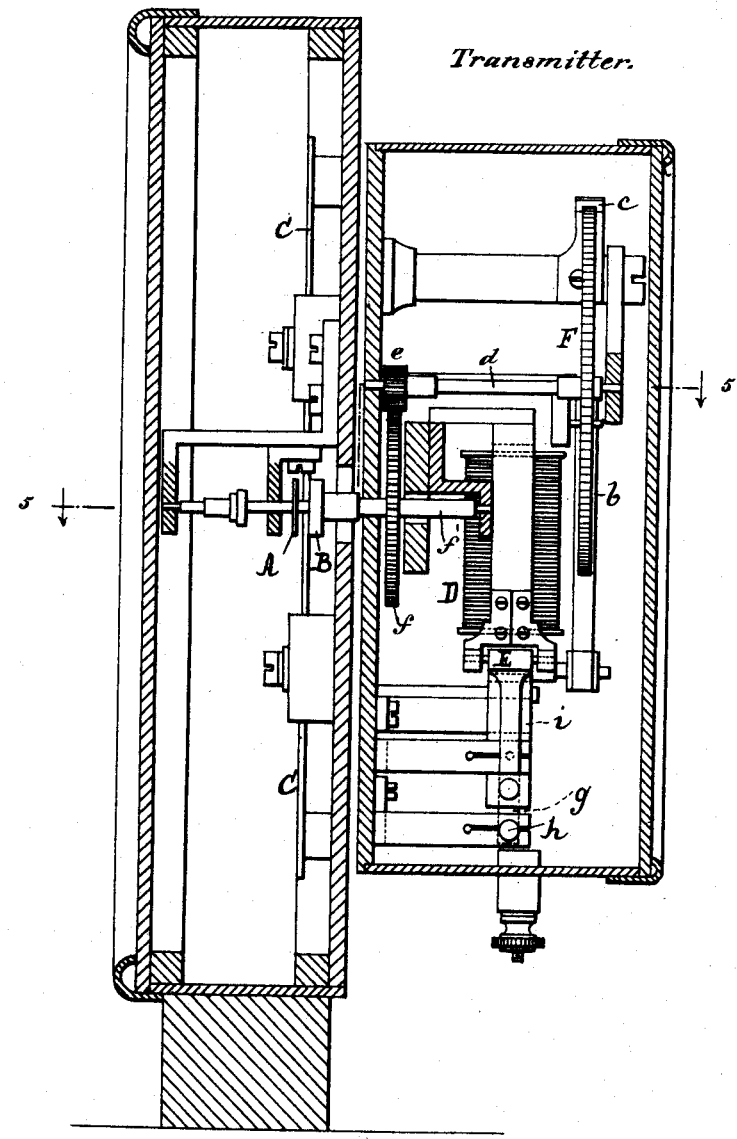

Figure 1 is a diagram showing the transmitter and receiver with their intervening circuit wires and connections. The transmitter is shown in Figs. 2 to 5, inclusive, whereof Fig. 2 is a front elevation. Fig. 3 is a rear elevation, the casing being open to expose the working parts. Fig. 4 is a vertical section cut in the planes indicated by the lines 4 4 in Figs. 2 and 3. Fig. 5 is a horizontal section cut in the plane of the line 5 5 in Fig. 4.

The receiver is shown in Figs. 6 to 11, inclusive, whereof Fig. 6 is a front elevation. Fig. 7 is a rear elevation. Fig. 8 is an elevation looking from the front and partly in section on the line 8 8 in Fig. 9. Fig. 9 is a plan. Fig. 10 is a vertical section in the plane of the line 10 10 in Figs. 6, 7, and 9. Fig. 11 is an end elevation looking from the left, as denoted by the arrow 11 in Fig. 6.

Referring to Fig. 1, the system comprises a transmitter placed at T and a receiver situated at R. The connection of the transmitter and the receiver is established by a line of wires arranged as shown in the drawings.

In order to understand the operation of the system, it is necessary to study first the construction of the transmitter with reference to Figs. 2 to 5.

The transmitter comprises a needle or other index A, movable over a dial, graduated sector, or other scale C, and obedient to the action of any apparatus whatever for measurement or observation—such as a thermometer, barometer, manometer, water-level indicator, &c. This needle is arranged in front of a follower B, consisting of a vibrating arm provided with two pins or other contacts $a\ a'$, between which is arranged the needle A, the latter holding itself normally in the fork formed by these pins and without touching either of them. One of the pins $a$ is insulated from the follower B and connected by a wire to the binding-post 1. The other pin $a'$ is not insulated from the follower, the latter being connected by a wire to the binding-post 2. The binding-post 3 is connected to the local battery P of the transmitting-station.

It will be understood that as long as the condition of the measuring or observing apparatus remains unchanged the needle A is not subject to variation, but remains motionless between the two pins $a\ a'$; but as soon as a change occurs the needle A is displaced and touches either the pin $a$ or the pin $a'$. Immediately thereupon an electric current furnished by the battery P, Fig. 1, and flowing thence through wire 14 and binding-post 3 to the needle A, is sent by contact $a$ or $a'$ either by wire 15 from the binding-post 1 or by the wire 16 from the binding-post 2. This current passes to the receiver, and, as will be seen presently, it has the effect of causing a displacement of the index of the register. It is sufficient for the present to add that at the same time that the index of the receiver is moved by the current received from the transmitter, as will presently be explained, another electric current is sent from the receiving-station to the transmitting-station, and it arrives either over the wire 19 to the binding-post 4, if the first current sent by the transmitter passed out through the binding-post 1, or it arrives over the wire 20 to the binding-post 5, if the said first current from the transmitter was sent by the binding-post 2. These binding-posts 4 and 5 are seen in dotted lines in Fig. 1, and are shown in rear elevation in Fig. 3 on a larger scale with the mechanisms with which they are in connection, respectively. Each of these respective mechanisms in its entirety comprises an electro-magnet D, the armature E of which is jointed to a lever forming at $b$ a pawl for engaging a ratchet-wheel F, which is provided with a detaining-pawl $c$. The wheel F is mounted on an arbor $d$, on which is a pinion $e$, Figs. 3 and 4, meshing with a wheel $f$, the arbor $f'$ of which carries the follower-arm B, which is arranged behind the needle.

It results from the preceding description that the operation of the system will be as follows: Let us suppose that the needle A, Fig. 2, shall be caused to turn in the direction of the arrow $x$. It touches the contact-pin $a$, and an electric current is sent by the wire from the binding-post 1 to the receiver. Thereupon the receiving-station sends in its turn a current which arrives at the binding-post 4 and circulates in the electro-magnet D. The armature E of the latter is attracted, and its pawl $b$ moves up and turns the ratchet-wheel F a little way in the direction of the arrow $y$ in Fig. 3. This motion is transmitted to the follower-arm B, which is caused to advance in the direction of the arrow $z$ in Fig. 2, so that the contact-pin $a$ ceases to touch the needle. The current sent by the transmitter is thus interrupted.

As will be seen later on, it is absolutely necessary that the currents furnished to the receiver shall be of short duration; hence, supposing that the advancement that is imparted to the needle A of the transmitter should be greater than the interval which separates the needle from the pin $a$ or $a'$, there must, nevertheless, be an absolute cessation of current from the transmitter even when at the time of the displacement of the follower-arm B the needle A does not quit the pin $a$, which it has previously touched. In order that this interruption of the current shall be produced in an absolute manner, I arrange underneath each electro-magnet D an interrupter composed of a leaf-spring $g$, pressing against a stop-screw $h$. An arm $i$ is fixed to the armature E and carries a stop-screw, which, when the armature is attracted, encounters the spring $g$ and presses it away from the stop $h$, so that the current which was sent by the transmitter through A, $a$, 1 and wire 15 to the receiver, and thence back by wire 17 to the binding-post 8 of the transmitter, Fig. 3, and which flows thence through the contact $h$ and spring $g$ to the binding-post 8', Fig. 3, and thence by wire 18 back to the battery P, Fig. 1, becomes interrupted by the break between the spring $g$ and contact $h$.

The receiver, which is represented in detail in Figs. 6 to 11, will now be described.

The receiver comprises two electro-magnets G G, corresponding, respectively, to the wires 15 and 16, coming from the binding-posts 1 and 2 of the transmitter—that is to say, so that one or the other of the electro-magnets receives a current, according as the needle A of the transmitter touches the contact-pin $a$ or the contact-pin $a'$. Each electro-magnet G has an armature H, retracted by a spring $j$, Fig. 7. The arbor $k$ of each armature H actuates an escapement. (Seen in vertical section, Fig. 8, and in horizontal section, Fig. 9.) This escapement consists of a forked arm or anchor I, the fork of which is turned in to form pallets for holding a pin $l$ on the scape-wheel of a clock-work mechanism. There are two of these mechanisms Q and Q', corresponding, respectively, to the two electro-magnets G G, and each consisting of one or any number of wheels constituting a train, and driven by spring-barrels S S', respectively, or by other suitable motors. When the armature H of either electro-magnet G is attracted, the lower pallet of its anchor I disengages the pin $l$, and the clock-work commences to advance; but it is almost immediately stopped again by the pin encountering the upper pallet of the anchor. When the current ceases, the retraction of the armature oscillates the anchor I, and its upper pallet disengages the pin $l$, whereupon the clock-work runs down until another pin $l'$, set diametrically opposite in the scape-wheel J, encounters the lower pallet of the anchor I, whereupon it is arrested thereby and the running down of the clock-work ceases. Thus it is seen that each attraction of the armature H, whatever may be its duration, causes an advance of the clock-work, which is always the same and which corresponds to a half-turn of the wheel J, carrying the pins $l\ l'$. Consequently if this displacement has such a value that it may be translated by the space which in the transmitter, Fig. 2, separates the needle A from a pin $a\ a'$ a contact of the needle with the pin will cause the current to be sent into the corresponding electro-magnet G, Figs. 6 to 8, which will result in a proportional running down or rotation of the clock-work. It will soon be seen how this running down of the clock-work may be translated for the production of a permanent indication. The arbor $m$ of the clock-work Q, Figs. 6, 8, and 9, extends outside of the box which incloses the clock-works and carries a pinion $n$, which gears with a large wheel K. The arbor $m'$ of the right-hand clock-work Q' drives a large wheel K' through the medium of a pinion $n'$. As the two spring barrels S S' turn (in the construction shown) in the same direction, and the two wheels K K' must turn in opposite directions, two pinions $o\ o'$ are interposed between the arbor $m'$ and the driving-train. The two wheels K K' are mounted loosely on an arbor L. They are formed with crown-teeth $b'$ on their reciprocally-projecting faces, and between these teeth and gearing with both is arranged a pinion $p$, mounted on the extremity of an arm $q$, which is fixed on the arbor L. This is the arrangement of an epicycloidal train. The arbor L carries also a pinion $r$, which meshes with a toothed sector M, the pivot $s$ of which carries a long needle N, which constitutes the index of the receiving-instrument. This needle N may be provided at its extremity with a stylus or tracing-point of any kind which touches a sheet of graduated paper placed on the drum U, which is driven continuously at uniform speed by a clock-movement, in the manner well known, with registering mechanisms, and which forms no part of the present invention.

It will be understood that the successive contacts of the needle A of the transmitter, Fig. 2, with the pins $a$ or $a'$ are translated by exciting one or other of the electro-magnets G, and thence by the movement to a constant extent at each contact of the corresponding clock-work, which movement is manifested by the rotation of the wheel K or K', as the case may be, and hence, by a rotation of the arbor L and the displacement of the needle N, the movement of the latter being either upward or downward.

If the transmitting-needle A remains stationary, no current arrives at the receiver. The needle N consequently remains immovable, and its point traces a straight horizontal line on the paper which is moved against it. When at any moment the needle A ascends, one or several currents arrive in the corresponding electro-magnet G of the receiver, and the needle N of the latter also ascends and traces an upward curve on the diagram. The contrary movement takes place if the needle A descends. The sinuosities of the curve reveal the variations of position of the transmitting-needle A, and the ordinates of this curve give at each moment the exact position of said needle on its dial.

It only remains to explain now how the sending of the electric current from the receiver to the electro-magnets D of the transmitter is effected in order to displace the follower and break contact with the needle. This transmission of current should take place, as has been seen, as soon as a current has been sent from the transmitter to one of the electro-magnets G of the receiver by the contact of the needle of the transmitter with one of the contact-pins. This return-current ought to occur only once, notwithstanding that an imperfect contact of the needle A with one of the pins $a$ $a'$ may give rise to the emission of vibratory currents in the electromagnet G. This result is obtained by arranging on the arbor of the wheel J, Figs. 6, 8, and 11, on the outside of the box inclosing the clock-works, a cam $t$, Fig. 6, acting on a lever $u$, the free end of which carries a rod of platinum $v$, adapted to enter a cup of mercury $x'$. A little spring $y'$ is arranged at the pivot of this lever $u$, as seen in Fig. 9, in order to press down the point $v$ into the mercury, and thereby to close the circuit for the electric current which is transmitted to the electro-magnet D of the transmitter. This movement of the lever $u$ takes place each time that the armature H of the corresponding electro-magnet G is attracted and frees the pin $l$ from the lower pallet of the anchor I, the consequent slight turn of the scape-wheel J before its pin is caught by the upper pallet being sufficient to carry the cam $t$ out from under the pin on the lever $u$, so that the latter drops. When, finally, the scape-wheel J becomes free and executes a half-turn, it rotates the cam $t$ a half-revolution, thereby again lifting the lever $u$ and stopping with the latter upheld. This cam is thus made double, corresponding with the two pins $l\ l'$ on the scape-wheel J. When the circuit is closed between the point $v$ and the mercury-cup $x'$, the current passes by the wire 6 and the binding-post 7 to the line traversing the wire 19, which conducts it to the corresponding electro-magnet D of the transmitter. If the other electro-magnet G has acted, thereby causing the other point $v$ to dip into the other mercury-cup $x'$, the current flows through the wire $6'$ to the binding-post $7'$, and thence over the line-wire 20 to the transmitting-station, where it enters the other electro-magnet D. Thus when a current is sent to the receiving-station it excites one of the magnets G, and the corresponding anchor releases the clock-work, and it makes a slight initial movement, enough to drop the lever $u$, whereby a return-current is sent to the transmitting-station, the effect of which is to interrupt the current of transmission between $h$ and $g$, and usually also between A and $a$ or $a'$. On this interruption the armature of the magnet G is retracted and the pallet releases the clock-work for its secondary and more prolonged movement, during which the index N is moved, and pending this movement, or most of it, the return-current is maintained by the continued immersion of the pin $v$ in the mercury during its upward movement until finally, when this pin is lifted out, the return-current is broken and the contact at $g\ h$ in the transmitter is re-established, so that the transmitter can send another current, which it will do immediately if A be already in contact with $a$ or $a'$, or, if not, whenever it shall move into contact therewith.

As seen in Fig. 8 the contact of the point $v$ and the mercury in the cup is made by a downward plunge and by a slow and continuous lifting-out movement, which assures a perfect contact, and in addition the certain transmission of a single prolonged current to the electro-magnet D of the transmitter, the rotary movement of a half-turn of the cam $t$ being otherwise rendered uniform and sufficiently slow by reason of the regulator-fly which controls the movement of the clock-work.

My invention may be considerably modified in matters of detail without departing from its essential features. It will readily be understood by electricians that the number of line-wires may be reduced by the employment of polarized relays in the manner well known, and which it is not deemed necessary to illustrate. My invention is applicable equally to the transmission of the movements of sliding indexes or to the rise and fall of columns of mercury or other liquid, or my invention may be applied in any case where it is desired to transmit the varying movements of any object at one point to be reproduced in the similar movements of another part at a distance.

My invention may be availed of for transmitting movements occurring in one direction only by omitting the portion of the mechanism which in such case would be disused—namely, one of the magnets D and contacts $a$ or $a'$ of the transmitter and one of the magnets G and one of the clock-works of the receiver, with its return-transmitter $w\ v\ x'$, as also the disused wires of the circuit.

I have described my invention as operated on the "open-circuit system," the transmissions being effected by closing the circuit; but obviously it might without essential change be worked on the "closed-circuit system," wherein the transmissions are made by breaking the circuit, this change requiring only a transposition or inversion of contacts, &c., such as is well understood by electricians.

I claim as my invention the following-defined novel features and combinations, substantially as herein specified, viz:

1. In a system for telegraphically transmitting the indications of a movable index, the combination of a circuit-closer at the transmitting-station, in connection with said index, for transmitting an electric impulse upon the movement thereof, a line-circuit operated by said circuit-closer, a receiving-instrument having a receiving-magnet in connection with said circuit, and means for terminating the impulse over said circuit, connected to and operated by the receiving-instrument, whereby when said circuit is closed or broken to transmit a movement it is restored to its normal condition only as a consequence of the operation of the receiving-instrument.

2. In a system for telegraphically transmitting the indications of a movable index, the combination, at the transmitting-station, of said index, circuit-closing transmitting-contacts connected therewith for closing the circuit upon the movement thereof, and a magnet controlling the breaking of the circuit, and, at the receiving-station, of a receiving electro-magnet in connection with the circuit closed by said transmitting-contacts, and a return-transmitter operated through the agency of said magnet and in circuit-connection with the magnet at the transmitting-station, whereby when the circuit is closed by the transmitting-contacts it remains closed until broken by the action of the magnet at the transmitting-station, and is broken only as a consequence of the operation of the receiving-instrument.

3. In a system for telegraphically transmitting the indications of a movable index, the combination, at the transmitting-station, of said index, circuit-closing transmitting-contacts connected therewith for closing the circuit upon the movement thereof, and a magnet for effecting the separation of said contacts, and, at the receiving-station, of a receiving electro-magnet in circuit with said transmitting-contacts to be excited by the closure thereof, a return transmitting-circuit closer operated to close the circuit as a result of the excitation of said magnet and to break it as a result of the demagnetization thereof, connected in circuit with the magnet at the transmitting-station, whereby when the circuit is closed at the transmitting-station it excites the receiving-magnet, the return-circuit closer is operated, and the magnet at the transmitting-station is consequently excited and separates the transmitting - contacts, thereby breaking the circuit to the receiving-magnet, which is demagnetized, and consequently the return-circuit closer is operated to break its circuit, thereby restoring the apparatus for another operation.

4. In a system for telegraphically transmitting the indications of a movable index, the combination, at the transmitting-station, of said index, circuit-closing transmitting-contacts connected therewith for closing the circuit upon the movement thereof, a separate circuit-breaker in the same circuit with said transmitting-contacts, and a magnet operating said circuit-breaker, and, at the receiving-station, of a receiving electro-magnet in connection with the circuit closed by said transmitting-contacts, and a return-transmitter operated through the agency of said magnet and in circuit-connection with the magnet at the transmitting-station, whereby when the receiving-magnet is excited the return-transmitter sends an impulse to the magnet at the transmitting-station, which effects the breaking of the transmitting-circuit at said separate circuit-breaker.

5. In a system for telegraphically transmitting the indications of a movable index, the combination, at the transmitting-station, of transmitting-contacts connected to and movable with said index, reciprocal contacts and a follower carrying the latter, a circuit including said contacts and adapted to be closed thereby upon the movement of the index a magnet connected to said follower and adapted when operated to advance the follower in the direction of the movement of the index and thereby to break or tend to break said circuit at said contacts, and a separate circuit-breaker in said circuit and operated by said magnet, and, at the receiving-station, of a receiving electro-magnet in connection with said circuit, and a return-transmitter operated through the agency of said receiving-magnet and in circuit-connection with the magnet at the transmitting-station, whereby when the circuit is closed by the transmitting-contacts it remains closed until the excitation of the magnet at the transmitting-station, and is thereby positively broken at said separate circuit-breaker simultaneously with the advance movement of the follower and independently of whether such advance movement is sufficient to open the transmitting-contacts.

6. In a system for telegraphically transmitting the indications of a movable index, the combination, at the transmitting-station, of transmitting-contacts connected to and movable with said index, reciprocal contacts and a follower carrying the latter, a circuit including said contacts and adapted to be closed thereby upon the movement of the index, a magnet connected to said follower and adapted when operated to advance the follower in the direction of the movement of the index and thereby break or tend to break said circuit at said contacts, and a separate circuit-breaker in said circuit and operated by said magnet to break the circuit during the excitation thereof, and, at the receiving-station, of a receiving electro-magnet in said circuit, a clock-work mechanism released by the excitation and demagnetization of said magnet, a return transmitting-circuit closer operated to close a circuit as a result of the excitation of said magnet and to break it upon the running down of said clock-work to a predetermined extent after the demagnetization of said magnet, and said circuit-closer connected in circuit with the magnet at the transmitting-station, whereby when the circuit is closed at the transmitting-station it excites the receiving-magnet, and the return-circuit closer sends a current to the magnet at the transmitting-station, which acts to advance said follower and break the transmitting-circuit, whereby the receiving-magnet is demagnetized and the clock-work runs down, and to hold said circuit broken during the running down of said clock-work, and, finally, the return-circuit closer is operated to break its circuit, thereby restoring the apparatus for another operation.

7. In a system for telegraphically transmitting the indications of a movable index, the combination, as a transmitting-instrument, of circuit-closing transmitting-contacts connected to and movable with said index, reciprocal contacts and a follower carrying the latter, two magnets in a circuit independent of said contacts connected to said follower and each adapted upon being excited to advance the follower, the respective magnets acting to move the follower in opposite directions, and a circuit-breaker in circuit with said contacts and connected to both of said magnets, so as to be operated to break the circuit by the operation of either magnet.

8. In a system for telegraphically transmitting the indications of a movable index, the combination, as a receiving-instrument, of a receiving-magnet, a clock-work normally restrained thereby and released by the operation thereof, adapted when released to run down to a predetermined extent, and a circuit-closer connected to and operated by said clock-work and constructed to close a circuit upon the operative movement of said magnet and retain the same closed until after the retractile movement of said magnet and operating to break the circuit upon the running down of said clock-work to a certain extent, whereby it is adapted to transmit a prolonged current at each disengagement over a circuit with which it may be in operative connection.

9. In a system for telegraphically transmitting the indications of a movable index, the combination, as a receiving-instrument, of a receiving-magnet, a clock-work, an interposed escapement by which the clock-work is normally restrained, constructed to impart a short initial movement to the clock-work upon the operative movement of the magnet and a prolonged secondary movement to the clock-work upon the retractile movement of the magnet, and a circuit-closer in connection with said clock-work operated by said short initial movement to close a circuit and restored during the long secondary movement of the clock-work to break the circuit.

10. In a system for telegraphically transmitting the indications of a movable index, the combination, as a receiving-instrument, of two clock-works, an index movable in one direction by one clock-work and in the opposite direction by the other, a receiving electro magnet or magnets adapted when operated to liberate the one or the other of said clock-works, and two circuit-closers operated upon the release of the respective clock-works.

11. In a system for telegraphically transmitting the indications of a movable index, the combination, as a receiving-instrument, of a receiving-magnet, a clock-work mechanism normally restrained thereby and liberated upon the operation thereof and constructed to run down to a predetermined extent at each movement, a rotary cam driven by said clock-work, and a circuit-closing transmitter normally upheld by said cam arranged to be dropped to close the circuit upon the starting of said cam and to be relifted to break the circuit by the continued rotation of the cam.

12. In a system for telegraphically transmitting the indications of a movable index, the combination, as a receiving-instrument, of two electro-magnets, two clock-work mechanisms connected to said magnets, respectively, normally restrained thereby, and each adapted to run down to a predetermined extent upon the operation of its corresponding magnet, the two large wheels of an epicycloidal train driven by said clock-works, respectively, and movable in opposite directions, the intermediate pinion of said train, an arm on which said pinion is mounted, and the indicating needle or index of the receiver connected to said arm so as to be moved thereby, whereby said index is moved a certain distance in one direction or the other, according as one or the other magnet is operated.

In witness whereof I have hereunto signed my name in the presence of two subscribing witnesses.

FELIX RICHARD.

Witnesses:
JULES ARMENGAUD, Jr.,
R. J. PRESTON.